US012732914B2

(12) United States Patent
Barton et al.

(10) Patent No.: US 12,732,914 B2
(45) Date of Patent: Sep. 8, 2026

(54) DYNAMICALLY SELECTING RADIOS ON STATION TO REDUCE BATTERY CONSUMPTION

(71) Applicant: Cisco Technology, Inc., San Jose, CA (US)

(72) Inventors: Robert Edgar Barton, Richmond (CA); Indermeet Singh Gandhi, San Jose, CA (US); Jerome Henry, Pittsboro, NC (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 18/358,773

(22) Filed: Jul. 25, 2023

(65) Prior Publication Data

US 2024/0381263 A1 Nov. 14, 2024

Related U.S. Application Data

(60) Provisional application No. 63/502,106, filed on May 14, 2023.

(51) Int. Cl.
*H04W 52/02* (2009.01)

(52) U.S. Cl.
CPC ... *H04W 52/0248* (2013.01); *H04W 52/0229* (2013.01); *H04W 52/0264* (2013.01)

(58) Field of Classification Search
None
See application file for complete search history.

(56) References Cited

U.S. PATENT DOCUMENTS

2019/0297575 A1* 9/2019 Seok ................. H04W 52/0229
2020/0163141 A1 5/2020 Hsu et al.
2021/0100053 A1 4/2021 Park et al.
2021/0160742 A1 5/2021 Li et al.
2022/0337338 A1 10/2022 Homchaudhuri et al.
2023/0103061 A1* 3/2023 Shafin ............... H04W 52/0216 370/311
2024/0073983 A1* 2/2024 Choi ..................... H04W 28/02
(Continued)

FOREIGN PATENT DOCUMENTS

WO WO-2017186059 A1 * 11/2017 ........ H04W 36/0005

OTHER PUBLICATIONS

English Translation of WO 2017186059 A1 (Year: 2017).*
(Continued)

*Primary Examiner* — Saumit Shah
(74) *Attorney, Agent, or Firm* — Polsinelli P.C.

(57) ABSTRACT

Disclosed are systems, apparatuses, methods, computer readable medium, and circuits for transmitting, from an access point (AP), a multi-link device (MLD) grouping to a station device (STA); transmitting, from the AP, a policy to accept energy efficiency instructions that includes multi-link operation (MLO) in an energy conservation mode; transmitting, from the AP, instructions to reduce battery consumption by the station by limiting MLO operations and activating a single radio of a plurality of radios on the STA, wherein a remainder of the plurality of radios are inactive and powered off; determining, at the AP, that activity from the STA is increasing; and transmitting a wake-up message to one or more of the inactive radios on the STA.

20 Claims, 7 Drawing Sheets

(56) References Cited

U.S. PATENT DOCUMENTS

| | | | | |
|---|---|---|---|---|
| 2024/0205973 | A1 * | 6/2024 | Ryu | H04W 72/12 |
| 2025/0184893 | A1 * | 6/2025 | Hwang | H04W 74/08 |

OTHER PUBLICATIONS

Lan X., et al., "Enhanced Multilink Single-Radio Operation for the Next-Generation IEEE 802.11 BE Wi-Fi Systems", Hindawi, Oct. 6, 2022, pp. 1-11.

* cited by examiner

DYNAMICALLY SELECTING RADIOS ON STATION TO REDUCE BATTERY CONSUMPTION

CROSS-REFERENCE TO RELATED APPLICATIONS

This application claims priority to and benefit of U.S. provisional application No. 63/502,106, filed on May 14, 2023, which is expressly incorporated by reference herein in its entirety.

BACKGROUND

Wi-Fi devices are in operation at all times of the day in many locations. The devices are always awaiting activity to provide connectivity to a one or more users of the devices. The always on provides for the desired level of service to the users. However, the always on status leads to the devices consuming large amounts of energy even though there is no activity involved. Wi-Fi technology has undergone continuous evolution and innovation since its inception, resulting in significant advancements with each new generation. Following Wi-Fi 5 (802.11ac) there has been Wi-Fi 6 (802.11ax) and Wi-Fi 7 (802.11be).

Wi-Fi 5 introduced substantial upgrades over its predecessor, Wi-Fi 4 (802.11n). It introduced the use of wider channel bandwidths, multi-user MIMO (Multiple-Input Multiple-Output), and beamforming technologies. These advancements significantly increased data transfer rates and improved network capacity, allowing multiple devices to simultaneously connect and communicate more efficiently. Wi-Fi 6 included enhanced orthogonal frequency-division multiple access (OFDMA) and target wake time (TWT) mechanisms and included greater frequency, and improved overall spectral efficiency and power management and better performance in crowded areas. Wi-Fi 7 (802.11be) delivers speeds of up to 30 Gbps, utilizing multi-band operation, advanced MIMO techniques, and improved modulation schemes. Wi-Fi 7 also focuses on reducing latency and enhancing security features.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
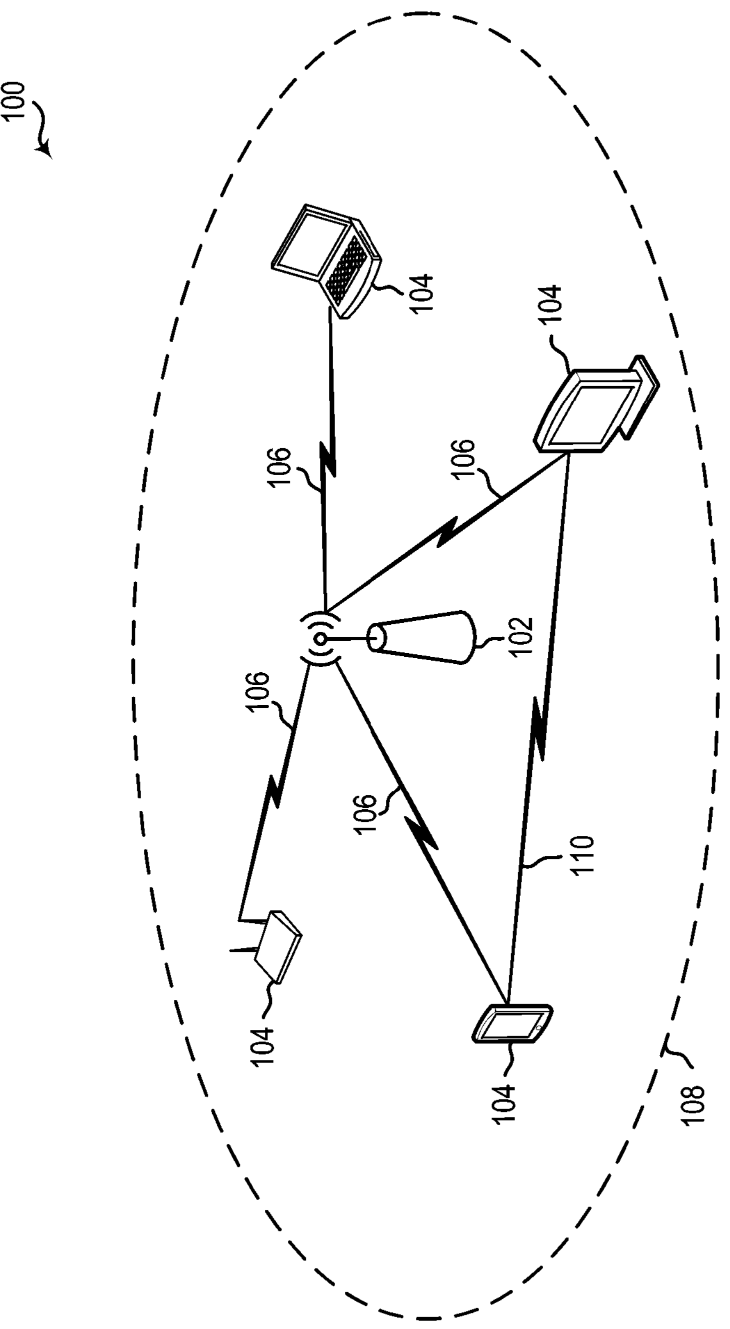
FIG. 1 shows a block diagram of an example wireless communication network according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

IEEE 802.11, commonly referred to as Wi-Fi, has been around for three decades and has become arguably one of the most popular wireless communication standards with billions of devices supporting more than half of the worldwide wireless traffic. The increasing user demands in terms of throughput, capacity, latency, spectrum and power efficiency calls for updates or amendments to the standard to keep up with them. As such, Wi-Fi generally has a new amendment after every 5 years with its own characteristic features. In the earlier generations, the focus was primarily higher data rates, but with ever increasing density of devices, area efficiency has become a major concern for Wi-Fi networks. Due to this issue, the last (802.11 be (Wi-Fi 7)) amendments focused more on the efficiency issue. The next expected update to IEEE 802.11 is coined as Wi-Fi 8. Wi-Fi 8 will attempt to further enhance throughput and minimize latency to meet the ever growing demand for the Internet of Things (IoT), high resolution video streaming, low-latency wireless services, etc. Wi-Fi 8 (802.11ce) aims to revolutionize wireless connectivity by pushing data rates to new heights, reaching up to 100 Gbps. It is expected to introduce advancements like terahertz frequencies, enhanced spatial reuse, and advanced beamforming techniques, paving the way for futuristic applications and seamless connectivity experiences.

Multiple Access Point (AP) coordination and transmission in Wi-Fi refers to the management of multiple access points in a wireless network to avoid interference and ensure efficient communication between the client devices and the network. When multiple access points are deployed in a network—for instance in buildings and office complexes—they operate on the same radio frequency, which can cause interference and degrade the network performance. To mitigate this issue, access points can be configured to coordinate their transmissions and avoid overlapping channels.

Wi-Fi 7 introduced the concept of multi-link operation (MLO), which gives the devices (Access Points (APs) and Stations (STAs)) the capability to operate on multiple links (or even bands) at the same time. MLO introduces a new paradigm to multi-AP coordination which was not part of the earlier coordination approaches. MLO is considered in Wi-Fi-7 to improve the throughput of the network and address the latency issues by allowing devices to use multiple links.

A multi-link device (MLD) may have several "affiliated" devices, each affiliated device having a separate PHY interface, and the MLD having a single link to the Logical Link Control (LLC) layer. In the proposed IEEE 802.11 be draft, a multi-link device (MLD) is defined as: "A device that is a logical entity and has more than one affiliated station (STA) and has a single medium access control (MAC) service access point (SAP) to logical link control (LLC), which includes one MAC data service" (see: LAN/MAN Standards Committee of the IEEE Computer Society, Amendment 8: Enhancements for extremely high throughput (EHT), IEEE P802.11be™/D0.1, September 2020, section 3.2). Connection(s) with an MLD on the affiliated devices may occur independently or jointly. A preliminary definition and scope of a multi-link element is described in section 9.4.2.247b of aforementioned IEEE 802.11 be draft. An idea behind this information element/container is to provide a way for multi-link devices (MLDs) to share the capabilities of different links with each other and facilitate the discovery and association processes. However, this information element may still be changed or new mechanisms may be introduced to share the MLO information (e.g. related to backhaul usage).

In multi-link operation (MLO) both STA and APs can possess multiple links that can be simultaneously active. These links may or may not use the same bands/channels.

MLO allows sending PHY protocol data units (PPDUs) on more than one link between a STA and an AP. The links may be carried on different channels, which may be in different frequency bands. Based on the frequency band and/or channel separation and filter performance, there may be restrictions on the way the PPDUs are sent on each of the links.

MLO may include a basic transmission mode, an asynchronous transmission mode, and a synchronous transmission mode.

In a basic transmission mode, there may be multiple primary links, but a device may transmit PPDU on one link at a time. The link for transmission may be selected as follows. The device (such as an AP or a STA) may count down a random back off (RBO) on both links and select a link that wins the medium for transmission. The other link may be blocked by in-device interference. In basic transmission mode, aggregation gains may not be achieved.

In an asynchronous transmission mode, a device may count down the RBO on both links and perform PPDU transmission independently on each link. The asynchronous transmission mode may be used when the device can support simultaneous transmission and reception with bands that have sufficient frequency separation such as separation between the 2.4 GHz band and the 5 GHz band. The asynchronous transmission mode may provide both latency and aggregation gains.

In a synchronous PPDU transmission mode, the device may count down the RBO on both links. If a first link wins the medium, both links may transmit PPDUs at the same time. The transmission at the same time may minimize in-device interference and may provide both latency and aggregation gains.

Multi-AP coordination and MLO are two features proposed to improve the performance of Wi-Fi networks in the upcoming IEEE 802.11 be amendment. Multi-AP coordination is directed toward utilizing (distributed) coordination between different APs to reduce inter-Basic Service Set (BSS) interference for improved spectrum utilization in dense deployments. MLO, on the other hand, supports high data rates and low latency by leveraging flexible resource utilization offered by the use of multiple links for the same device.

Systems, methods, and computer-readable media are provided for reducing battery consumption by a station. An example method can include transmitting, from an access point (AP), a multi-link device (MLD) grouping to a station device (STA); transmitting, from the AP, a policy to accept energy efficiency instructions that includes multi-link operation (MLO) in an energy conservation mode; transmitting, from the AP, instructions to reduce battery consumption by the station by limiting MLO operations and activating a single radio of a plurality of radios on the STA, wherein a remainder of the plurality of radios are inactive and powered off; determining, at the AP, that activity from the STA is increasing; and transmitting a wake-up message to one or more of the inactive radios on the STA.

An example system can include one or more processors and at least one computer-readable storage medium storing instructions which, when executed by the one or more processors, cause the one or more processors to transmit, from an access point (AP), a multi-link device (MLD) grouping to a station device (STA); transmit, from the AP, a policy to accept energy efficiency instructions that includes multi-link operation (MLO) in an energy conservation mode; transmit, from the AP, instructions to reduce battery consumption by the station by limiting MLO operations and activate a single radio of a plurality of radios on the STA, wherein a remainder of the plurality of radios are inactive and powered off; determine, at the AP, that activity from the STA is increasing; and transmit a wake-up message to one or more of the inactive radios on the STA.

An example non-transitory computer-readable storage medium having stored therein instructions which, when executed by a processor, cause the processor to transmit, from an access point (AP), a multi-link device (MLD) grouping to a station device (STA); transmit, from the AP, a policy to accept energy efficiency instructions that includes multi-link operation (MLO) in an energy conservation mode; transmit, from the AP, instructions to reduce battery consumption by the station by limiting MLO operations and activate a single radio of a plurality of radios on the STA, wherein a remainder of the plurality of radios are inactive and powered off; determine, at the AP, that activity from the STA is increasing; and transmit a wake-up message to one or more of the inactive radios on the STA.

FIG. 1 shows a block diagram of an example wireless communication network according to some aspects of the present disclosure. Wireless communication network 100 can be an example of a wireless local area network (WLAN) such as a Wi-Fi network (and will hereinafter be referred to as WLAN 100). For example, WLAN 100 can be a Wi-Fi network operating based on any currently available or to be developed IEEE 802.11 protocols and standards (e.g., 802.11ay, 802.11ax, 802.11az, 802.11ba and 802.11be, etc.). WLAN 100 may include wireless communication devices such as an AP 102 and multiple STAs 104. The number of APs and STAs are not limited to that shown in FIG. 1 and can be more or less. Any one or more of AP 102 and STAs 104 may be capable of MLO (multi-link reception and/or transmission).

Each of STAs 104 can be any one or more of user equipment devices including: mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), IoT devices, etc. Additionally, STAs 104 can include wireless routers.

A single AP 102 and an associated set of STAs 104 may be referred to as a basic service set (BSS), managed by AP 102.

FIG. 1 shows an example coverage area 108 of AP 102, which may represent a basic service area (BSA) of WLAN 100. BSS may be identified to users by a service set identifier (SSID), as well as to other devices by a basic service set identifier (BSSID), which may be a medium access control (MAC) address of AP 102. AP 102 can periodically broadcast beacons including BSSID to enable any STA 104 within wireless range of AP 102 to "associate" or re-associate with AP 102 to establish a communication link 106 with AP 102. For example, the beacons can include an identification of a primary channel used by respective AP 102 as well as a timing synchronization function for establishing or maintaining timing synchronization with AP 102.

To establish a communication link 106 with an AP 102, each of STAs 104 is configured to perform passive or active scans on frequency channels in one or more frequency bands (for example, the 2.4 GHZ, 5 GHZ, 6 GHZ or 60 GHz bands). Passive scans entail a STA 104 listening for beacons transmitted by AP 102 at a periodic time interval referred to as the target beacon transmission time (TBTT) (measured in time units (TUs) where one TU may be equal to 1024 microseconds (μs)). Active scans entail a STA 104 generating and sequentially transmitting probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with a selected AP 102. AP 102 assigns an association identifier to STA 104 at the conclusion of the association operations, which AP 102 can then utilize to track STA 104.

As a result of the increasing ubiquity of wireless networks, a STA 104 may have the opportunity to select one of many APs 102 within range of the STA or to select among multiple APs 102 that together form an extended service set (ESS) including multiple connected APs 102. An extended network station associated with WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a roaming scan to find another AP 102 having more desirable network characteristics such as a greater received signal strength indicator (RSSI), a reduced traffic load, etc.

In some cases, STAs 104 may form ad-hoc networks without APs 102. In some examples, ad hoc networks may be implemented within a larger wireless network such as WLAN 100. In such implementations, while the STAs 104 may be capable of communicating with each other through the AP 102 using communication links 110, STAs 104 also can communicate directly with each other via direct wireless links 110. Additionally, two STAs 104 may communicate via a direct communication link 110 regardless of whether both STAs 104 are associated with and served by same AP 102. In such an ad hoc system, one or more of STAs 104 may assume the role filled by AP 102 in a BSS. Such a STA 104 may coordinate transmissions within the ad hoc network. Examples of direct wireless links 110 include Wi-Fi Direct connections, connections established by using a Wi-Fi Tunneled Direct Link Setup (TDLS) link, and/or any other known or to be developed direct wireless communication scheme.

APs 102 and STAs 104 may function and communicate (via the respective communication links 106 and 110) according to the IEEE 802.11 family of wireless communication protocol standards. AP 102 and STAs 104 in WLAN 100 may transmit PPDUs over an unlicensed spectrum that can include frequency bands used by Wi-Fi technology, such as the 2.4 GHz band, the 5 GHz band, the 60 GHz band, the 3.6 GHz band, and the 900 MHz band. Some implementations of AP 102 and STAs 104 described herein also may communicate in other frequency bands, such as the 6 GHz band, which may support both licensed and unlicensed communications. AP 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHZ, or 6 GHz bands, each of which can be divided into multiple 20 MHz channels. PPDUs can be transmitted over a physical channel having a minimum bandwidth of 20 MHz or larger channels having bandwidths of 40 MHz, 80 MHz, 160 or 320 MHz, etc., which can be formed by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
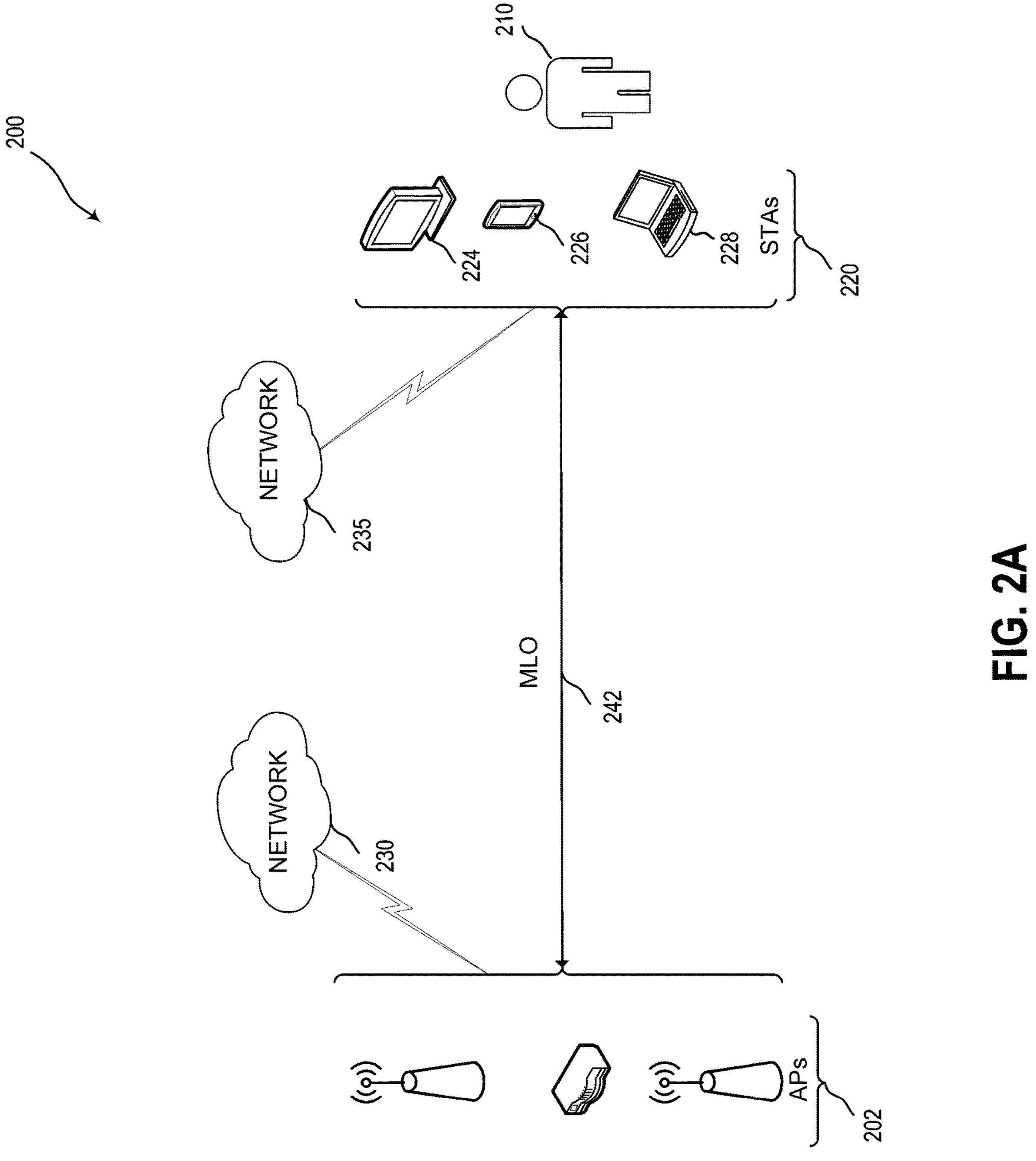
FIG. 2A is a network diagram illustrating an example network environment of multi-link operation according to some aspects of the present disclosure.

FIG. 2A is a network diagram illustrating an example network environment of multi-link operation according to some aspects of the present disclosure. Wireless network 200 may include one or more STAs 220 (includes example devices 224, 226, and 228) and one or more APs 202, which may communicate in accordance with IEEE 802.11 communication standards. STAs 220 and APs 202 may be the same as STAs 104 and AP 102 of FIG. 1, respectively.

One or more STAs 220 and/or APs 202 may be operable by one or more user(s) 210.

STAs 220 and/or APs 202 may also include mesh stations in, for example, a mesh network, in accordance with one or more IEEE 802.11 standards and/or 3GPP standards.

Any of STAs 220 and AP(s) 202 may be configured to communicate with each other via one or more communications networks 230 and/or 235, which may be the same as WLAN 100. STAs 220 may also communicate peer-to-peer or directly with each other with or without AP(s) 202. Any of the communications networks 230 and/or 235 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 230 and/or 235 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 230 and/or 235 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 220 and AP(s) 202 may be configured to perform directional transmission and/or directional reception in conjunction with wirelessly communicating in a wireless network. Any of STAs 220 and AP(s) 202 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of STAs 220 and AP(s) 202 may be configured to perform any given directional transmission towards one or more defined transmit sectors. Any of STAs 220 and AP(s) 202 may be configured to perform any given directional reception from one or more defined receive sectors.

Multiple Input-Multiple Output (MIMO) beamforming in a wireless network may be accomplished using RF beamforming and/or digital beamforming. In some embodiments, in performing a given MIMO transmission, STAs 220 and/or AP(s) 202 may be configured to use all or a subset of its one or more communications antennas to perform MIMO beamforming.

Any of STAs 220 and AP(s) 202 may include any suitable radio and/or transceiver for transmitting and/or receiving radio frequency (RF) signals in the bandwidth and/or channels corresponding to the communications protocols utilized by any of STAs 220 and AP(s) 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g. 802.11n, 802.11ax), 5 GHz channels (e.g., 802.11n, 802.11ac. 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one example, and with reference to FIG. 2A, APs 102 may facilitate multi-link operation 242 with one or more STAs 220.

In one example, multi-link operation 242 may have a single-radio non-access point (AP) MLD listen to two or more channels simultaneously by (1) configuring a 2×2 Tx/Rx (or M×M Tx/Rx) to allocate a 1×1 resource on each channel/band (e.g., 5 GHZ and 6 GHZ), (2) add extra Rx modules, or (3) add wake-up receivers. An AP MLD then transmits on any idle channel a control frame (e.g., request to send (RTS) or multi-user (MU) RTS) before either a single data frame or a group of data frames within a single transmit opportunity (TXOP) to indicate that frames will be transmitted on that channel. The non-AP MLD responds back with a control frame (e.g., clear to send (CTS)). The single-radio non-AP MLD configures its radio back to 2×2 Tx/Rx module on the channel it received the control frame from the AP MLD and receives data. When using a wake-up receiver (802.11ba), the AP MLD transmits a wake-up packet. This also could be extended to other architectures with different antenna configurations. As example, a device with 3×3, when in that case a 2×2 resource on one channel and a 1×1 on another channel.

In one example, a multi-link operation 242 may enable a single-radio non-AP MLD to achieve throughput enhancement and latency reduction in a busy network without needing to implement a concurrent dual-radio, thus significantly reducing device cost.

Figure 2B:
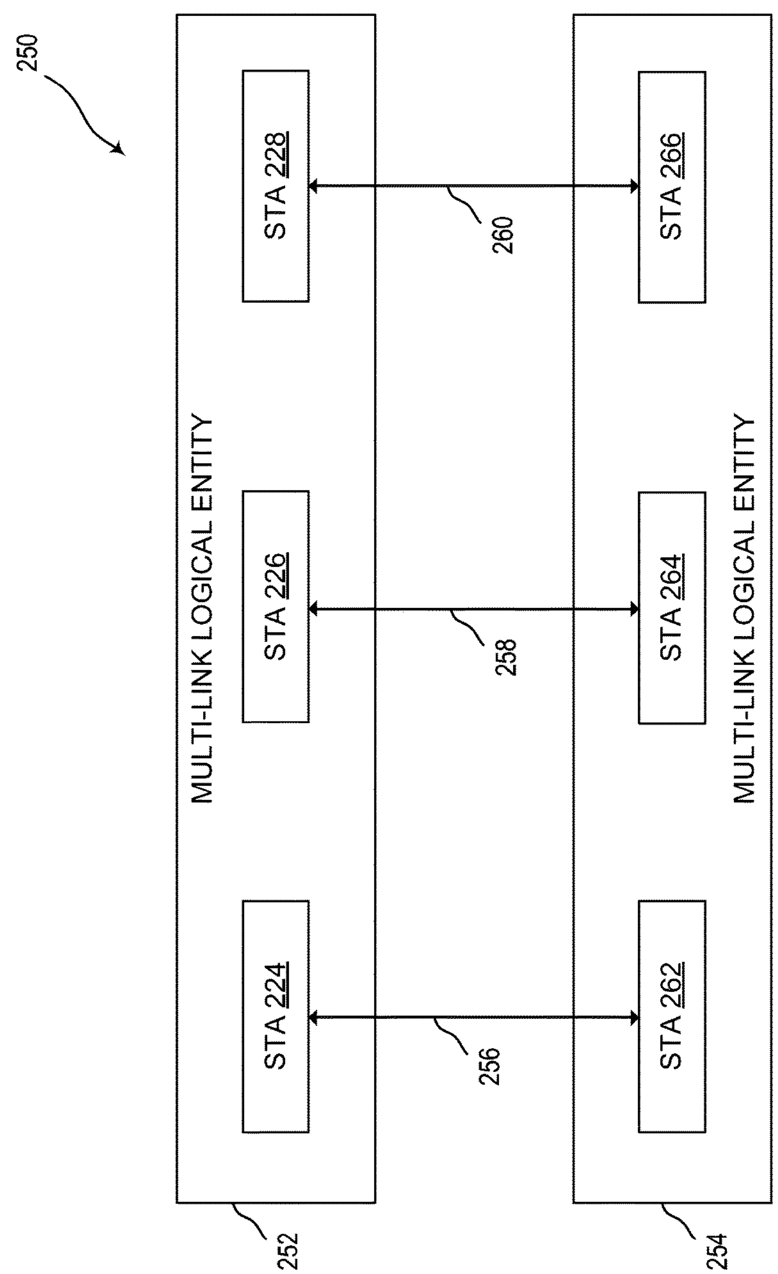
FIG. 2B depicts an illustrative schematic diagram for MLD between two logical entities according to some aspects of the present disclosure.

FIG. 2B depicts an illustrative schematic diagram for MLD between two logical entities according to some aspects of the present disclosure.

Referring to FIG. 2B, schematic diagram 250 shows two multi-link logical entities 252 and 254 that can set up communication links 256, 258, and 260 with each other. A multi-link logical entity may be a logical entity that contains one or more STAs such as STAs 220. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 2B, multi-link logical entity 252 and multi-link logical entity 254 may be two separate physical devices, where each one comprises a number of virtual or logical devices. For example, multi-link logical entity 252 may comprise three STAs such as STAs 224, 226, and 228. Multi-link logical entity 254 may include another three STAs (e.g., STAs 262, 264, and 266). In one example, STA 224 may communicate with STA 262 over link 256, STA 226 may communicate with STA 264 over link 258, and STA 228 may communicate with STA 266 over link 260.

Figure 2C:
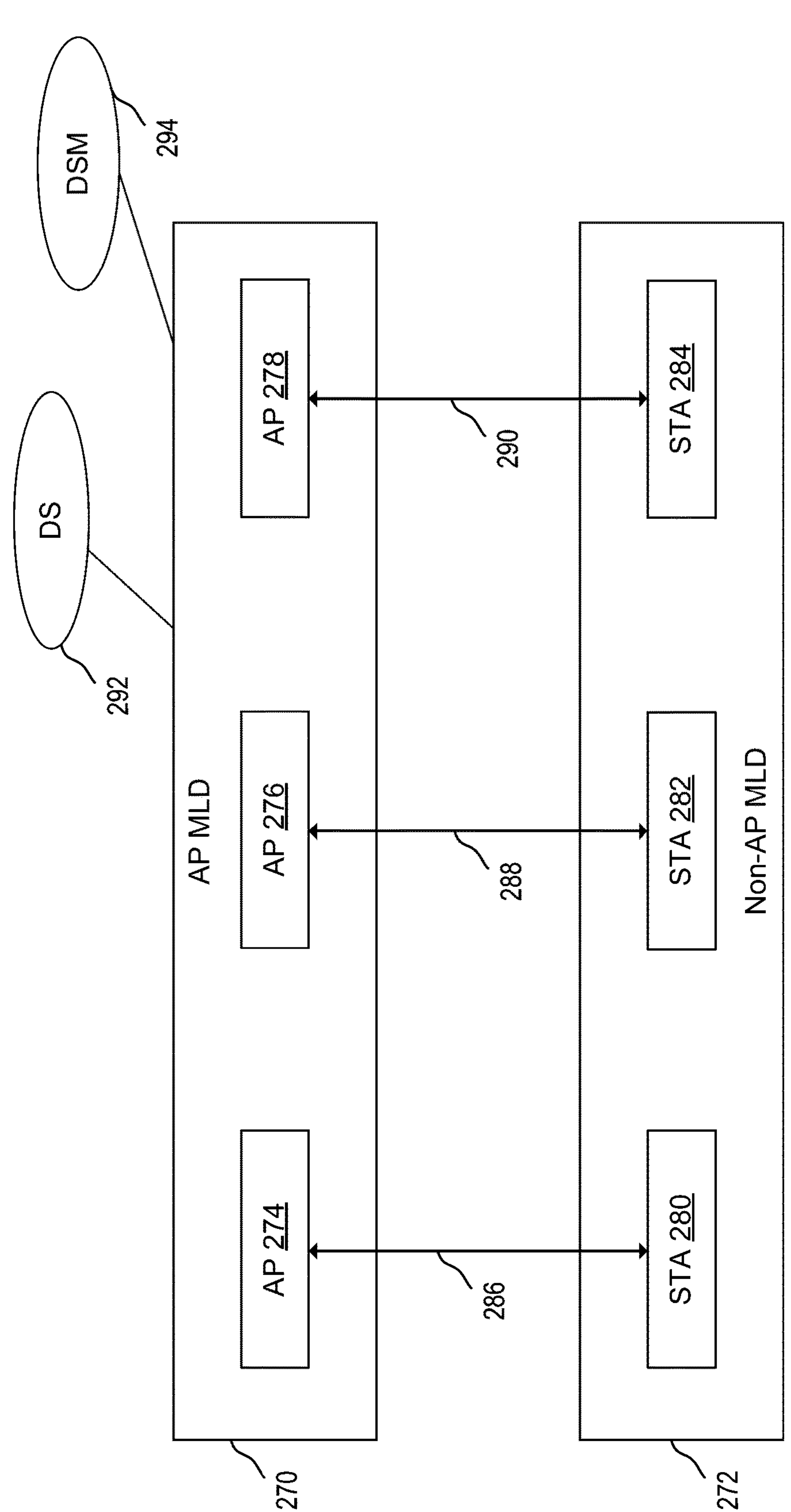
FIG. 2C depicts an illustrative schematic diagram for MLD between AP with logical entities and a non-AP with logical entities according to some aspects of the present disclosure.

FIG. 2C depicts an illustrative schematic diagram for MLD between AP with logical entities and a non-AP with logical entities according to some aspects of the present disclosure.

Referring to FIG. 2C, two multi-link logical entities 270 and 272 are shown. AP logical entity 270 may include physical and/or logical APs 274, 276, and 278 operating in different frequency bands (e.g., 2.4 GHz, 5 GHZ, and 6 GHz). APs 274, 276, and 278 can be the same as AP 102 and/or any one of APs 202 described above. Non-AP logical entity 272 may include STAs 280, 282, and 284, which may be the same as or similar to STAS 224, 226, 228, 262, 264, and/or 266.

AP 274 may communicate with STA 280 via link 286. AP 276 may communicate with STA 282 via link 288. AP 278 may communicate with STA 284 via link 290.

Multi-link AP logical entity 270 is shown in FIG. 2C to have access to a distribution system (DS) 292, which is a system used to interconnect a set of BSSs to create an extended service set (ESS). The multi-link AP logical entity 270 is also shown in FIG. 2C to have access a distribution system medium (DSM) 294, which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

The example WiFi systems and MLO described above with reference to FIGS. 1 and 2A-C may be implemented.

Figure 3:
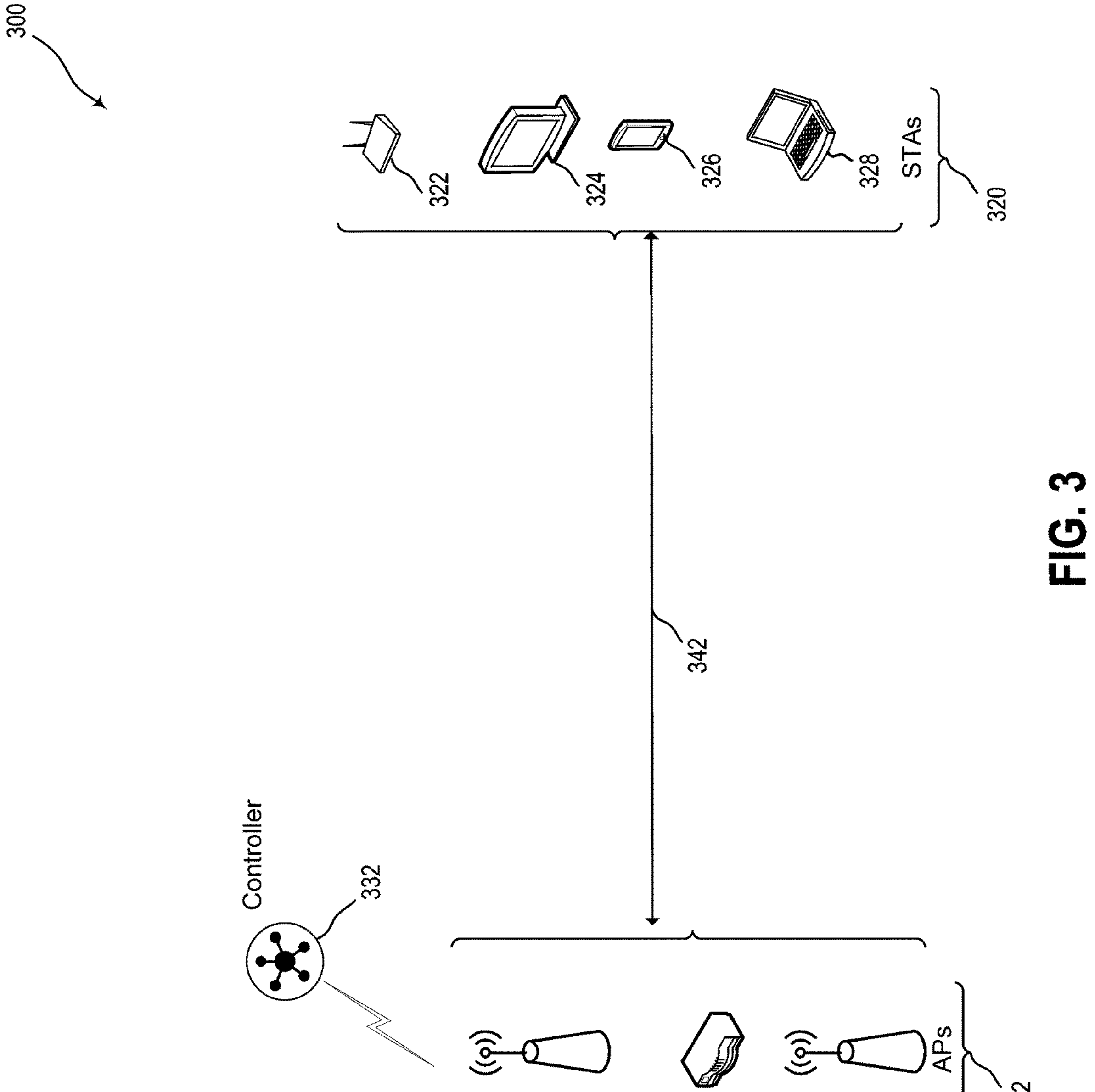
FIG. 3 illustrates a network environment according to some aspects of the present disclosure.
Figure 4:
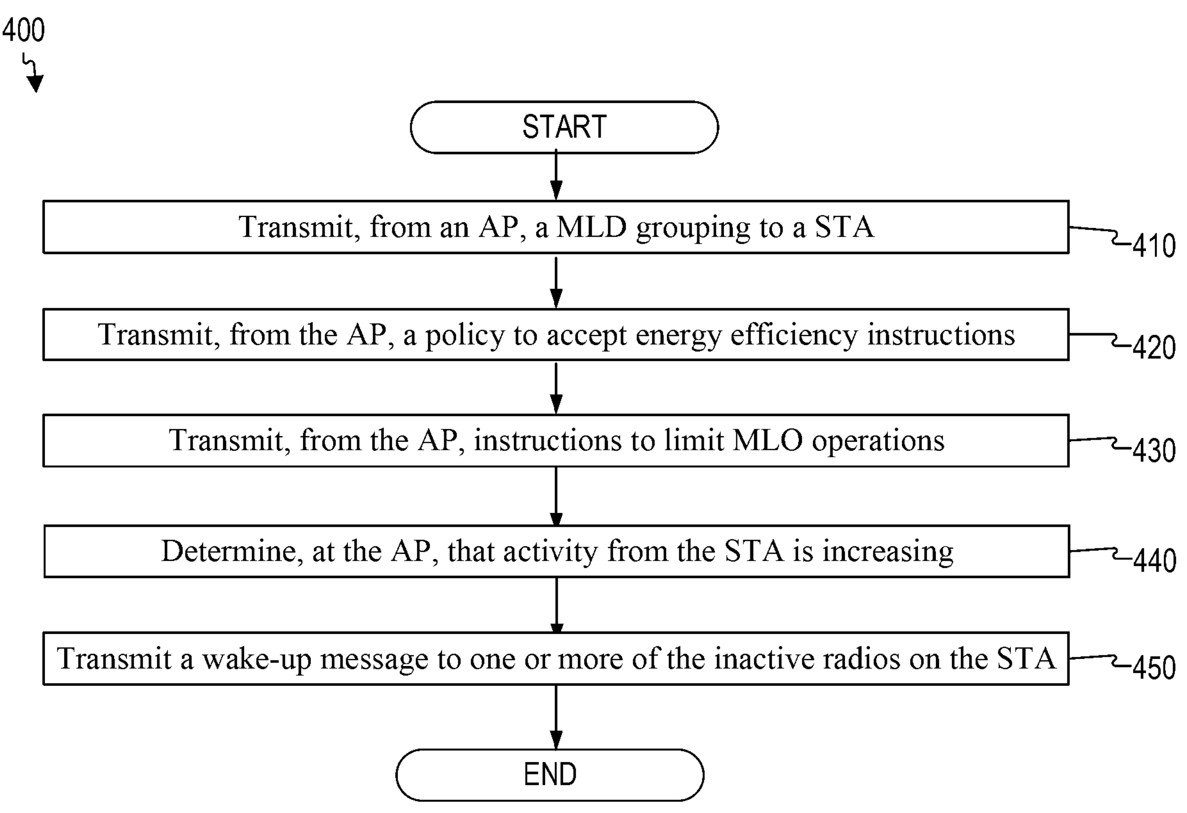
FIG. 4 illustrates an example flow chart according to some aspects of the present disclosure.

FIG. 3 illustrates an example of the flow of instructions from the controller 332 to the one or more stations 320 as described herein to implement the method as described in FIG. 4. FIG. 3 illustrates an example that is focused on the flow of information to control STAs 320 to operate in MLO or with only a single radio. While the STA 320 can be configured to allow for MLO operation that includes a plurality of radios, the present disclosure provides for enhanced energy savings by restricting the operation of applications on the STA, such that only applications that require MLO operation are allowed to operate with MLO. If the application does not require MLO operation, the AP 302 transmits instructions to the STA 320 to restrict MLO operation. The description provided above in FIGS. 1, 2A, 2B, and/or 2C can be implemented together with the present disclosure of FIGS. 3 and 4.

In at least one example, the system 300 can be a WLAN. The APs 302 can be as described above in FIG. 2A. The APs 302 can communicate 342 with the STAs 320. The STAs 320 can include user equipment such as television 324, a mobile phone 326, and a laptop computer 328. The STAs can include many other devices as described herein. In at least one example the STAs can include a router 322 that can be coupled to other devices.

An example according the present disclosure can be described such that MLD is enabled between a STA 320 and an AP 302. In one example, the functional use of the MLO links within the MLD group can be controlled by the STA 320. MLO offers advantages in low-latency applications, high-throughput applications, and during roaming. According to the present disclosure, the STA 320 operates with a single radio thereby entering into an energy conservation mode unless the applications or other circumstances require MLO operation.

The AP 302 and/or controller 332 can examine which application are in use by the STA 320 and determine if any of these are latency sensitive. This can be determined by differentiated services code point (DSCP), traffic identifier (TID), and/or SCS. Additionally, the AP 302 and/or controller 332 can determine the relative RSSI position of the STA 320. For example, the determination can indicate that the STA 320 is moving or will soon enter a roaming state. Additionally, 11 k reports can be examined.

FIG. 4 illustrates an example method 400 reducing battery consumption by a station. The APs can include those described above in FIGS. 1, 2A, 2B, 2C, and/or 3. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes transmitting, from an access point (AP), a multi-link device (MLD) grouping to a station device (STA) at block 410. For example, the AP 302 illustrated in FIG. 3 may perform the transmitting. The standby mode for the STA can be done for a single STA or across multiple STAs.

According to some examples, the method includes transmitting, from the AP, a policy to accept energy efficiency instructions that includes multi-link operation (MLO) in an energy conservation mode at block 420.

According to some examples, the method includes transmitting, from the AP, instructions to reduce battery consumption by the station by limiting MLO operations and activating a single radio of a plurality of radios on the STA, wherein a remainder of the plurality of radios are inactive and powered off at block 430.

In at least one example, the method can further include determining that latency limits for one or more applications exceed a predetermined threshold, and transmitting an instruction for MLO and activating at least one radio of the one or more inactive radios to exit energy conservation mode.

In at least one example, the method can include determining, at the AP, based on a corporate policy which applications on the STA are eligible for MLO operation. The STA can be configured to accept corporate policies according to a Microsoft Group Policy Object (GPO). The method can include transmitting an MLO application list to the STA to allow the STA to wake, when running an application on the MLO application list, the one or more inactive radios. The STA can use the application list to allow full MLO operation for only particular applications and disable other applications from operating in MLO and instead operate over a single radio.

The method can also include restricting applications that are not on the MLO application list from operating in MLO mode on one or more inactive radios that were activated. In restricting access to only applications that need the MLO, the STA can save on energy usage as the plurality of radios are not continuously operating for all applications. Additionally, in at least one example, the method can transmit, after activity from an application on the MLO application list has ceased, a sleep mode activation to previously inactive radios to enter an inactive mode again. The sleep mode activation allows for the STA to save power as soon as it is possible after the application that required MLO is no longer operational.

In at least one example, the GPO can include instructions that provides that if a predetermined application requires implementation of MLO if one or more predetermined criteria exceeds predefined levels. For example, if latency exceeds a predefined level, the application, based on the GPO, can enable MLO communication by turning one or more inactive radios into an active mode. The communication can proceed over the plurality of radios. In another example, if jittery exceeds a predefined level, the MLO can be activated. Furthermore, the GPO can provide for enabling MLO operation if the STA is about to enter a roaming zone and one or more latency sensitive application is operating on the STA.

Additionally, the method can include transmitting a traffic identifier (TID) to link map a plurality of radios in the STA and determine which of the plurality of radios in the STA are higher performing. The higher performing radios can be based on connection characteristics of bandwidth, latency, jitter, and/or throughput. The method can further include transmitting the energy efficiency instruction to one or more of the plurality of radios in the STA that are outside of the higher performing radios, such that the plurality of radios outside the higher performing radios enter an inactive state. In selecting the higher performing of the radios to remain active, the method allows for most communication to be conducted without implementing MLO and thereby increasing energy savings.

In at least one example, the energy efficient instructions include an individual target wake time. In at least one example, the energy efficient instruction are transmitted as one of a Target Wake Time (TWT) or a Restricted-TWT (R-TWT). In at least one example, the TWT and/or R-TWT can be set to be implemented by the STA according to corporate policy. The corporate policy can be implemented through one or more of the systems described herein including GPO. When a corporate policy is accepted by the STA, the TWT and R-TWT are no longer optional and will be performed by the STA.

Additionally, the method can determine if an application of the STA requires more than one radio to be operational. For example, when an application is designed with low latency requirements then it can make use of the MLO operations such that two or more radios of the STA are operational at the same time to transmit and/or receive data from the AP. When it is determined that the application requires more than one radio, the AP can transmit a wake-up message to the oner or more inactive radios on the STA.

According to some examples, the method includes determining, at the AP, that activity from the STA is increasing at block 440. The AP can determine that the activity is increasing from STA based upon communication exchanged with the STA.

According to some examples, the method includes transmitting a wake-up message to one or more of the inactive radios on the STA at block 450. Once the level of activity exceeds the acceptable limits for the operational radio on the STA, the AP can request that the STA enable the inactive radios to allow for the traffic to be handled through the MLO.

Additionally, the method can include determining that the STA is about to enter a roaming state, and transmitting a wake-up message to the one or more inactive radios on the STA. The AP can determine that the STA is about to enter the roaming state. In other examples, the STA can determine that the STA is about to enter the roaming state. In at least one example, as the STA determines it is about to enter the roaming state, the STA notifies the AP, which can then transmit the wake-up message. In other examples, the STA can send the wake-up message internally to the one or more inactive radios.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

Figure 5:
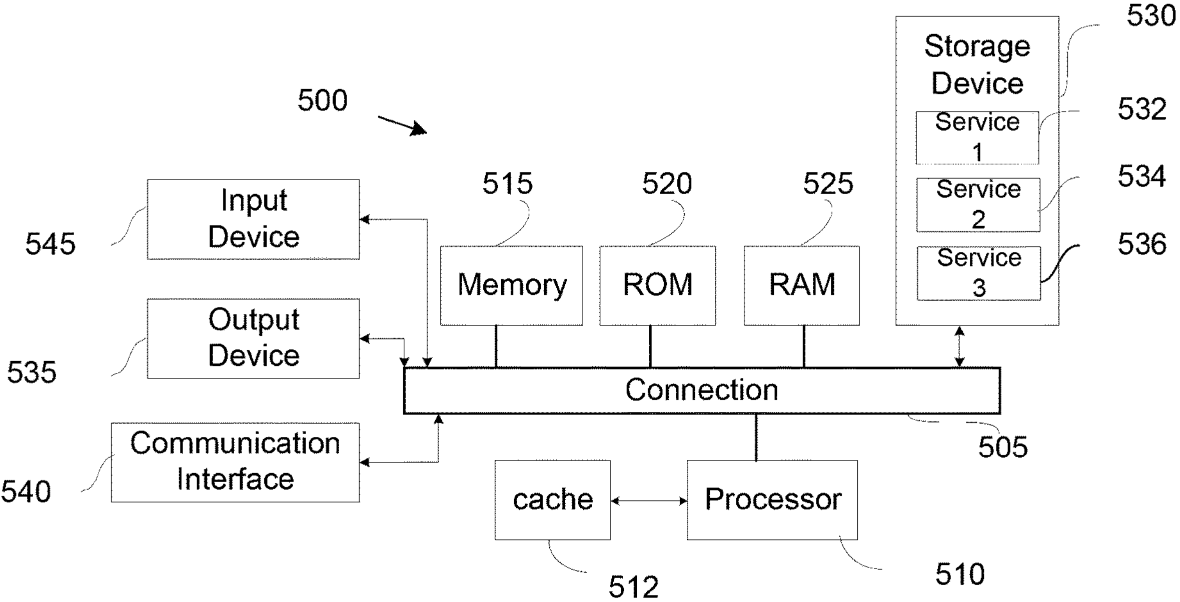
FIG. 5 shows an example of a system for implementing certain aspects of the present technology.

FIG. 5 shows an example of computing system 500, which can be for example any computing device making up components of systems described above with reference to FIGS. 1-4. Components of computing system 500 may be in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Aspect 1. A method of reducing battery consumption by a station, the method comprising: transmitting, from an access point (AP), a multi-link device (MLD) grouping to a station device (STA); transmitting, from the AP, a policy to accept energy efficiency instructions that includes multi-link operation (MLO) in an energy conservation mode; transmitting, from the AP, instructions to reduce battery consumption by the station by limiting MLO operations and activating a single radio of a plurality of radios on the STA, wherein a remainder of the plurality of radios are inactive and powered off; determining, at the AP, that activity from the STA is increasing; and transmitting a wake-up message to one or more of the inactive radios on the STA.

Aspect 2. The method of Aspect 1, further comprising: determining, at the AP, if an application of the STA requires more than one radio of the STA; and transmitting a wake-up message to the one or more inactive radios on the STA.

Aspect 3. The method of any of Aspects 1 to 2, further comprising: determining, at the AP, based on a corporate policy which applications on the STA are eligible for MLO operation; and when running an application on the MLO application list, the one or more inactive radios.

Aspect 4. The method of any of Aspects 1 to 3, further comprising: restricting applications that are not on the MLO application list from operating in MLO mode on one or more inactive radios that were activated.

Aspect 5. The method of any of Aspects 1 to 4, further comprising: transmitting, after activity from an application on the MLO application list has ceased, a sleep mode activation to previously inactive radios to enter an inactive mode again.

Aspect 6. The method of any of Aspects 1 to 5, wherein the energy efficient instructions include an individual target wake time.

Aspect 7. The method of any of Aspects 1 to 6, wherein the energy efficient instructions are transmitted as one of a Target Wake Time (TWT) or a Restricted-TWT (R-TWT).

Aspect 8. The method of any of Aspects 1 to 7, further comprising: transmitting a traffic identifier (TID) to link map a plurality of radios in the STA and determine which of the plurality of radios in the STA are higher performing; and transmitting the energy efficiency instruction to one or more of the plurality of radios in the STA that are outside of the higher performing radios, such that the plurality of radios outside the higher performing radios enter an inactive state.

Aspect 9. The method of any of Aspects 1 to 8, further comprising: determining that latency limits for one or more applications exceed a predetermined threshold; and transmitting an instruction for MLO and activating at least one radio of the one or more inactive radios to exit energy conservation mode.

Aspect 10. The method of any of Aspects 1 to 9, further comprising: determining that the STA is about to enter a roaming state; and transmitting a wake-up message to the one or more inactive radios on the STA.

Aspect 11. A system includes a storage (implemented in circuitry) configured to store instructions and a processor. The processor configured to execute the instructions and cause the processor to: transmit, from an access point (AP), a multi-link device (MLD) grouping to a station device (STA); transmit, from the AP, a policy to accept energy efficiency instructions that includes multi-link operation (MLO) in an energy conservation mode; transmit, from the AP, instructions to reduce battery consumption by the station by limiting MLO operations and activate a single radio of a plurality of radios on the STA, wherein a remainder of the plurality of radios are inactive and powered off; determine, at the AP, that activity from the STA is increasing; and transmit a wake-up message to one or more of the inactive radios on the STA.

Aspect 12. The system of Aspect 11, wherein the processor is configured to execute the instructions and cause the processor to: determine, at the AP, if an application of the STA requires more than one radio of the STA; and transmit a wake-up message to the one or more inactive radios on the STA.

Aspect 13. The system of any of Aspects 11 to 12, wherein the processor is configured to execute the computer readable medium and cause the processor to: determine, at the AP, based on a corporate policy which applications on the STA are eligible for MLO operation; and transmit an MLO application list to the STA to allow the STA to wake, when running an application on the MLO application list, the one or more inactive radios.

Aspect 14. The system of any of Aspects 11 to 13, wherein the processor is configured to execute the instructions and cause the processor to: restrict applications that are not on the MLO application list from operating in MLO mode on one or more inactive radios that were activated.

Aspect 15. The system of any of Aspects 11 to 14, wherein the processor is configured to execute the computer readable medium and cause the processor to: transmit, after activity from an application on the MLO application list has ceased, a sleep mode activation to previously inactive radios to enter an inactive mode again.

Aspect 16. The system of any of Aspects 11 to 15, wherein the energy efficient instructions include an individual target wake time.

Aspect 17. The system of any of Aspects 11 to 16, wherein the energy efficient instructions are transmitted as one of a Target Wake Time (TWT) or a Restricted-TWT (R-TWT).

Aspect 18. The system of any of Aspects 11 to 17, wherein the processor is configured to execute the instructions and cause the processor to: transmit a traffic identifier (TID) to link map a plurality of radios in the STA and determine which of the plurality of radios in the STA are higher performing; and transmit the energy efficiency instruction to one or more of the plurality of radios in the STA that are outside of the higher performing radios, such that the plurality of radios outside the higher performing radios enter an inactive state.

Aspect 19. The system of any of Aspects 11 to 18, wherein the processor is configured to execute the instructions and cause the processor to: determine that latency limits for one or more applications exceed a predetermined threshold; and transmit an instruction for MLO and activating at least one radio of the one or more inactive radios to exit energy conservation mode.

Aspect 20. The system of any of Aspects 11 to 19, wherein the processor is configured to execute the instructions and cause the processor to: determine that the STA is about to enter a roaming state; and transmit a wake-up message to the one or more inactive radios on the STA.

Aspect 21. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: transmit, from an access point (AP), a multi-link device (MLD) grouping to a station device (STA); transmit, from the AP, a policy to accept energy efficiency instructions that includes multi-link operation (MLO) in an energy conservation mode; transmit, from the AP, instructions to reduce battery consumption by the station by limiting MLO operations and activating a single radio of a plurality of radios on the STA, wherein a remainder of the plurality of radios are inactive and powered off; determine, at the AP, that activity from the STA is increasing; and transmit a wake-up message to one or more of the inactive radios on the STA.

Aspect 22. The computer readable medium of Aspect 21, wherein the processor is configured to execute the computer readable medium and cause the processor to: determine, at the AP, if an application of the STA requires more than one radio of the STA; and transmit a wake-up message to the one or more inactive radios on the STA.

Aspect 23. The computer readable medium of any of Aspects 21 to 22, wherein the processor is configured to execute the computer readable medium and cause the processor to: determine, at the AP, based on a corporate policy which applications on the STA are eligible for MLO operation; and when running an application on the MLO application list, the one or more inactive radios.

Aspect 24. The computer readable medium of any of Aspects 21 to 23, wherein the processor is configured to execute the computer readable medium and cause the processor to: restrict applications that are not on the MLO application list from operating in MLO mode on one or more inactive radios that were activated.

Aspect 25. The computer readable medium of any of Aspects 21 to 24, wherein the processor is configured to execute the computer readable medium and cause the processor to: transmit, after activity from an application on the MLO application list has ceased, a sleep mode activation to previously inactive radios to enter an inactive mode again.

Aspect 26. The computer readable medium of any of Aspects 21 to 25, wherein the energy efficient instructions include an individual target wake time.

Aspect 27. The computer readable medium of any of Aspects 21 to 26, wherein the energy efficient instructions are transmitted as one of a Target Wake Time (TWT) or a Restricted-TWT (R-TWT).

Aspect 28. The computer readable medium of any of Aspects 21 to 27, wherein the processor is configured to execute the computer readable medium and cause the processor to: transmit a traffic identifier (TID) to link map a plurality of radios in the STA and determine which of the plurality of radios in the STA are higher performing; and transmit the energy efficiency instruction to one or more of the plurality of radios in the STA that are outside of the higher performing radios, such that the plurality of radios outside the higher performing radios enter an inactive state.

Aspect 29. The computer readable medium of any of Aspects 21 to 28, wherein the processor is configured to execute the computer readable medium and cause the processor to: determine that latency limits for one or more applications exceed a predetermined threshold; and transmit an instruction for MLO and activating at least one radio of the one or more inactive radios to exit energy conservation mode.

Aspect 30. The computer readable medium of any of Aspects 21 to 29, wherein the processor is configured to execute the computer readable medium and cause the processor to: determine that the STA is about to enter a roaming state; and transmit a wake-up message to the one or more inactive radios on the STA.

What is claimed is:

1. A method of reducing battery consumption by a station, the method comprising:

transmitting, from an access point (AP), a multi-link device (MLD) grouping to a station device (STA);

transmitting, from the AP, a policy to accept energy efficiency instructions that includes multi-link operation (MLO) in an energy conservation mode;

transmitting, from the AP, instructions to reduce battery consumption by the STA by limiting MLO operations and activating a single radio of a plurality of radios on the STA, wherein a remainder of the plurality of radios are inactive and powered off;

determining, at the AP, that activity from the STA is increasing; and transmitting a wake-up message to one or more of the inactive radios on the STA.

2. The method of claim 1, further comprising:

determining, at the AP, if an application of the STA requires more than one radio of the STA; and transmitting a wake-up message to the one or more inactive radios on the STA.

3. The method of claim 1, further comprising:

determining, at the AP, based on a corporate policy which applications on the STA are eligible for MLO operation; and transmitting an MLO application list to the STA to allow the STA to wake, when running an application on the MLO application list, the one or more inactive radios.

4. The method of claim 3, further comprising:

restricting applications that are not on the MLO application list from operating in MLO mode on one or more inactive radios that were activated.

5. The method of claim 3, further comprising:

transmitting, after activity from an application on the MLO application list has ceased, a sleep mode activation to previously inactive radios to enter an inactive mode again.

6. The method of claim 1, wherein the energy efficient instructions include an individual target wake time.

7. The method of claim 6, wherein the energy efficient instructions are transmitted as one of a Target Wake Time (TWT) or a Restricted-TWT (R-TWT).

8. The method of claim 1, further comprising:

transmitting a traffic identifier (TID) to link map a plurality of radios in the STA and determine which of the plurality of radios in the STA are higher performing; and transmitting the energy efficiency instruction to one or more of the plurality of radios in the STA that are outside of the higher performing radios, such that the plurality of radios outside the higher performing radios enter an inactive state.

9. The method of claim 1, further comprising:

determining that latency limits for one or more applications exceed a predetermined threshold; and transmitting an instruction for MLO and activating at least one radio of the one or more inactive radios to exit energy conservation mode.

10. The method of claim 1, further comprising:

determining that the STA is about to enter a roaming state; and transmitting a wake-up message to the one or more inactive radios on the STA.

11. A system comprising:

a storage configured to store instructions; and a processor configured to execute the instructions and cause the processor to:

transmit, from an access point (AP), a multi-link device (MLD) grouping to a station device (STA);

transmit, from the AP, a policy to accept energy efficiency instructions that includes multi-link operation (MLO) in an energy conservation mode;

transmit, from the AP, instructions to reduce battery consumption by the STA by limiting MLO operations and activate a single radio of a plurality of radios on the STA, wherein a remainder of the plurality of radios are inactive and powered off;

determine, at the AP, that activity from the STA is increasing; and transmit a wake-up message to one or more of the inactive radios on the STA.

12. The system of claim 11, wherein the processor is further configured to execute the instructions and cause the processor to:

determine, at the AP, if an application of the STA requires more than one radio of the STA; and transmit a wake-up message to the one or more inactive radios on the STA.

13. The system of claim 11, wherein the processor is further configured to execute the instructions and cause the processor to:

determine, at the AP, based on a corporate policy which applications on the STA are eligible for MLO operation; and transmit an MLO application list to the STA to allow the STA to wake, when running an application on the MLO application list, the one or more inactive radios.

14. The system of claim 13, wherein the processor is further configured to execute the instructions and cause the processor to:

restrict applications that are not on the MLO application list from operating in MLO mode on one or more inactive radios that were activated.

15. The system of claim 13, wherein the processor is configured to execute the instructions and cause the processor to:

transmit, after activity from an application on the MLO application list has ceased, a sleep mode activation to previously inactive radios to enter an inactive mode again.

16. The system of claim 11, wherein the energy efficient instructions include an individual target wake time.

17. The system of claim 16, wherein the energy efficient instructions are transmitted as one of a Target Wake Time (TWT) or a Restricted-TWT (R-TWT).

18. The system of claim 11, wherein the processor is further configured to execute the instructions and cause the processor to:

transmit a traffic identifier (TID) to link map a plurality of radios in the STA and determine which of the plurality of radios in the STA are higher performing; and transmit the energy efficiency instruction to one or more of the plurality of radios in the STA that are outside of the higher performing radios, such that the plurality of radios outside the higher performing radios enter an inactive state.

19. The system of claim 11, wherein the processor is further configured to execute the instructions and cause the processor to:

determine that latency limits for one or more applications exceed a predetermined threshold; and transmit an instruction for MLO and activating at least one radio of the one or more inactive radios to exit energy conservation mode.

20. A non-transitory computer readable medium comprising instructions, the instructions, when executed by a computing system, cause the computing system to:

transmit, from an access point (AP), a multi-link device (MLD) grouping to a station device (STA);

transmit, from the AP, a policy to accept energy efficiency instructions that includes multi-link operation (MLO) in an energy conservation mode;

transmit, from the AP, instructions to reduce battery consumption by the STA by limiting MLO operations and activate a single radio of a plurality of radios on the STA, wherein a remainder of the plurality of radios are inactive and powered off;

determine, at the AP, that activity from the STA is increasing; and transmit a wake-up message to one or more of the inactive radios on the STA.

* * * * *